(12) United States Patent
Assmann

(10) Patent No.: US 8,688,922 B1
(45) Date of Patent: Apr. 1, 2014

(54) HARDWARE-SUPPORTED MEMORY MANAGEMENT

(75) Inventor: Ralf Assmann, Waldbronn (DE)

(73) Assignee: Marvell International Ltd, Hamilton (BM)

( * ) Notice: Subject to any disclaimer, the term of this patent is extended or adjusted under 35 U.S.C. 154(b) by 414 days.

(21) Appl. No.: 13/045,186

(22) Filed: Mar. 10, 2011

Related U.S. Application Data

(60) Provisional application No. 61/312,872, filed on Mar. 11, 2010.

(51) Int. Cl.
*G06F 12/00* (2006.01)
*G06F 13/00* (2006.01)
*G06F 13/28* (2006.01)

(52) U.S. Cl.
USPC ........... 711/152; 711/171; 711/172; 711/173; 711/118

(58) Field of Classification Search
USPC .................. 711/170–173, 118, 147, 152; 370/229–240
See application file for complete search history.

(56) References Cited

U.S. PATENT DOCUMENTS

| | | | |
|---|---|---|---|
| 4,611,299 A | 9/1986 | Hori et al. | |
| 4,823,340 A | 4/1989 | Grassman et al. | |
| 5,260,905 A | 11/1993 | Mori | |
| 5,307,343 A | 4/1994 | Bostica et al. | |
| 5,440,523 A | 8/1995 | Joffe | |
| 5,680,595 A | 10/1997 | Thomann et al. | |
| 5,719,890 A | 2/1998 | Thomman et al. | |
| 5,778,007 A | 7/1998 | Thomann et al. | |
| 5,802,131 A | 9/1998 | Morzano | |
| 5,815,447 A | 9/1998 | Thomann | |
| 5,875,470 A | 2/1999 | Dreibelbis et al. | |
| 5,953,340 A | 9/1999 | Scott et al. | |
| 5,996,051 A | 11/1999 | Mergard | |
| 6,021,086 A | 2/2000 | Joffe | |
| 6,034,957 A | 3/2000 | Haddock et al. | |
| 6,067,301 A | 5/2000 | Aatresh | |
| 6,081,528 A | 6/2000 | Thomann | |
| 6,115,389 A | 9/2000 | Mahale et al. | |
| 6,160,814 A | 12/2000 | Ren et al. | |
| 6,167,491 A | 12/2000 | McAlpine | |
| 6,216,205 B1 | 4/2001 | Chin et al. | |

(Continued)

FOREIGN PATENT DOCUMENTS

| | | |
|---|---|---|
| FR | 2779843 | 12/1999 |
| JP | 1162294 | 6/1989 |
| JP | 4061094 | 2/1992 |
| JP | 5047174 | 2/1993 |
| JP | 10506776 | 6/1998 |
| JP | 2004288355 | 10/2004 |
| JP | 5107204 | 10/2012 |

OTHER PUBLICATIONS

"Non-Final Office Action", U.S. Appl. No. 12/434,000, Mar. 14, 2013, 18 pages.
"Final Office Action", U.S. Appl. No. 13/092,734, (Dec. 29, 2011), 6 pages.
"Notice of Allowance", U.S. Appl. No. 12/163,801, (Mar. 22, 2012), 6 pages.
"Notice of Allowance", U.S. Appl. No. 13/092,734, (Feb. 23, 2012), 4 pages.
"Foreign Office Action", Japanese Application No. 2008-270813, (Apr. 3, 2012), 6 pages.
"Non-Final Office Action", U.S. Appl. No. 12/434,000, (May 4, 2012), 15 pages.
"6-Port Fast Ethernet Switch, 88E6060 (Product Overview)", *Link Street*; www.marvell.com; *Marvell Semiconductor, Inc.*; Sunnyvale, CA, (2002), 2 pgs.

(Continued)

*Primary Examiner* — Ryan Bertram

(57) ABSTRACT

The present disclosure describes a memory block manager. In some aspects a memory block allocation request is received from a packet-based interface, a memory block is allocated to the packet-based interface, and allocation of the memory block to another packet-based interface is prevented. In other aspects a request to free a memory block is received from a packet-based interface and the memory block is freed to allow the memory block to be reallocated.

20 Claims, 7 Drawing Sheets

(56) References Cited

U.S. PATENT DOCUMENTS

| | | |
|---|---|---|
| 6,230,191 B1 | 5/2001 | Walker |
| 6,370,624 B1 | 4/2002 | Ajanovic et al. |
| 6,446,173 B1 | 9/2002 | Pham |
| 6,487,207 B1 | 11/2002 | Thomann |
| 6,535,939 B1 | 3/2003 | Arimilli et al. |
| 6,535,963 B1 | 3/2003 | Rivers |
| 6,539,488 B1 | 3/2003 | Tota et al. |
| 6,618,390 B1 | 9/2003 | Erimli et al. |
| 6,712,704 B2 | 3/2004 | Elliott |
| 6,714,643 B1 | 3/2004 | Gargeya et al. |
| 6,732,184 B1 | 5/2004 | Merchant et al. |
| 6,735,773 B1 | 5/2004 | Trinh et al. |
| 6,741,589 B1 | 5/2004 | Sang et al. |
| 6,785,272 B1 | 8/2004 | Sugihara |
| 7,039,781 B2 | 5/2006 | Iwata et al. |
| 7,068,651 B2 | 6/2006 | Schmidt et al. |
| 7,099,325 B1 | 8/2006 | Kaniz et al. |
| 7,130,308 B2 * | 10/2006 | Haddock et al. ............ 370/423 |
| 7,136,953 B1 | 11/2006 | Bisson et al. |
| 7,149,834 B2 | 12/2006 | Peters et al. |
| 7,185,132 B2 | 2/2007 | Tang |
| 7,197,591 B2 | 3/2007 | Kwa et al. |
| 7,249,270 B2 | 7/2007 | Mansell et al. |
| 7,329,136 B2 | 2/2008 | Su et al. |
| 7,334,072 B1 | 2/2008 | Wright |
| 7,359,997 B2 | 4/2008 | Ishida et al. |
| 7,447,824 B2 | 11/2008 | Jabori et al. |
| 7,451,280 B2 | 11/2008 | Furtek et al. |
| 7,469,311 B1 | 12/2008 | Tsu et al. |
| 7,478,188 B2 | 1/2009 | Patton |
| 7,480,757 B2 | 1/2009 | Atherton et al. |
| 7,480,808 B2 | 1/2009 | Caruk et al. |
| 7,496,707 B2 | 2/2009 | Freking et al. |
| 7,536,490 B2 | 5/2009 | Mao |
| 7,539,809 B2 | 5/2009 | Juenger |
| 7,571,287 B2 | 8/2009 | Lee et al. |
| 7,583,600 B1 | 9/2009 | Schanke et al. |
| 7,606,960 B2 | 10/2009 | Munguia |
| 7,624,221 B1 | 11/2009 | Case |
| 7,660,925 B2 | 2/2010 | Larson et al. |
| 7,685,322 B2 | 3/2010 | Bhesania et al. |
| 7,689,753 B2 | 3/2010 | Kwak et al. |
| 7,752,342 B2 | 7/2010 | Tee et al. |
| 7,822,955 B2 | 10/2010 | Flynn et al. |
| 7,949,817 B1 | 5/2011 | Sakarda |
| 8,205,028 B1 | 6/2012 | Sakarda |
| 8,234,425 B1 | 7/2012 | Milner |
| 8,335,878 B2 | 12/2012 | Lee |
| 2001/0036116 A1 | 11/2001 | Kubo et al. |
| 2003/0154314 A1 | 8/2003 | Mason, Jr. et al. |
| 2004/0093389 A1 | 5/2004 | Mohamed et al. |
| 2004/0193774 A1 | 9/2004 | Iwata et al. |
| 2004/0202192 A9 * | 10/2004 | Galbi et al. ................ 370/412 |
| 2005/0008011 A1 * | 1/2005 | Georgiou et al. ............ 370/389 |
| 2005/0268001 A1 | 12/2005 | Kimelman et al. |
| 2006/0031628 A1 * | 2/2006 | Sharma ...................... 711/105 |
| 2006/0075144 A1 | 4/2006 | Challener et al. |
| 2006/0106962 A1 | 5/2006 | Woodbridge et al. |
| 2007/0002880 A1 * | 1/2007 | Chien et al. ................ 370/412 |
| 2008/0148083 A1 | 6/2008 | Pesavento et al. |
| 2008/0215773 A1 | 9/2008 | Christison et al. |
| 2008/0215774 A1 | 9/2008 | Kim et al. |
| 2008/0265838 A1 | 10/2008 | Garg et al. |
| 2008/0320189 A1 | 12/2008 | Arssov |
| 2009/0200982 A1 | 8/2009 | Hurtz |

OTHER PUBLICATIONS

"7-Port Fast Ethernet Switch with 802.1 Q, 88E6063 (Product Overview)", www.marvell.com; *Marvell Semiconductor, Inc.*; Sunnyvale, CA, (2002), 2 pgs.

"Advisory Action", U.S. Appl. No. 10/702,744, (Sep. 11, 2007), 3 pages.

"Advisory Action", U.S. Appl. No. 12/163,801, (Jan. 24, 2011), 2 pages.

"European Communication and Search Report", Application No. EP04006012; *European Patent Office*; Munich, Germany, (May 30, 2005), 4 pages.

"European Search Report", Application No. EP04006012; Munich, Germany, (May 30, 2005), 4 pages.

"Final Office Action", U.S. Appl. No. 10/702,744, (Jun. 25, 2007), 13 pages.

"Final Office Action", U.S. Appl. No. 12/163,801, (Oct. 14, 2010), 12 pages.

"Final Office Action", U.S. Appl. No. 12/163,801, (Nov. 14, 2011), 12 pages.

"Final Office Action", U.S. Appl. No. 12/182,014, (Oct. 29, 2010), 16 pages.

"Final Office Action", U.S. Appl. No. 12/434,000, (Apr. 26, 2011), 15 pages.

"Final Office Action", U.S. Appl. No. 12/494,076, (Mar. 30, 2011), 13 pages.

"Final Office Action", U.S. Appl. No. 12/494,076, (Oct. 3, 2011), 13 pages.

"Foreign Office Action", Japanese Application No. 2004-071574, (Feb. 19, 2008), 4 pages.

"Foreign Office Action", Japanese Application No. 2008-270813, (May 26, 2011), 4 pages.

"Information Technology—Telecommunications and Information Exchange Between Systems—Local and Metropolitan Area Networks—Specfic Requirements", *IEEE*, Wireless LAN Medium Access Control (MAC) and Physical Layer (PHY) Specifications,(Aug. 20, 1999), 531 pages.

"Link Street 88E6063 7-Port Fast Ethernet Switch with QoS, 802.1Q VLAN, and Virtual Cable Tester (VCT) Technology", *Marvell: News*; www.marvell.com; *Marvell Semiconductor, Inc.*; Sunnyvale, CA, (Jul. 14, 2003), 1 page.

"Link Street 88E6181 8-Port Gigabit Ethernet Switch with Four-Level QoS", *Marvell: News*; www.marvell.com; Marvell Semiconductor, Inc.; Sunnyvale, CA, (Jul. 14, 2003), 1 page.

"Link Street, Integrated Gateway Router with Multi-Port QoS Switch 88E6218 (Product Overview)", *Gateway Solutions*; www.marvell.com; *Marvell Semiconductor, Inc.*; Sunnyvale, CA, (2003), 2 pages.

"Link Street, Integrated Gateway Router with Multi-Port Switch, 88E6208 (Product Overview)", *Gateway Solutions*; www.marvell.com; *Marvell Semiconductor, Inc.*; Sunnyvale, CA, (2003), 2 pages.

"Marvell Link Street Gigabit Ethernet Switches Enable the Rapid Deployment of Gigabit Connectivity for the SOHO Market", *Marvell: Press and Investor News; Marvell Semiconductor, Inc.*; Sunnyvale, CA; http://www.marvell.com/press/pressNewsDisplay.do?releaseID=347, (Apr. 29, 2003), 2 pgs.

"Method and Circuit for Transferring Data with Dynamic Parity Generation and Checking Scheme in Multi-port DRAM", esp@cenet; Publication No. JP10506776T (Abstract of Corresponding Document No. US5778007); esp@cenet Database—Worldwide; http://v3.espacenet.com/textdoc?DB=EPODOC& IDX=JP10506776T&F=0, (Jun. 30, 1998), 5 pages.

"Multiport Component Memory Series and Application with a Computer", *Automated Translation; Europaisches Patentamt, European Patent Office, Office Europeen Des Brevets; Description of FR2779843; World Lingo Language Translation Services*; www.worldlingo.com, (Nov. 19, 2007), 15 pgs.

"Non-Final Office Action", U.S. Appl. No. 12/182,014, (Jun. 1, 2010), 13 pages.

"Non-Final Office Action", U.S. Appl. No. 10/702,744, (Feb. 19, 2009), 5 pages.

"Non-Final Office Action", U.S. Appl. No. 10/702,744, (Dec. 27, 2006), 10 pages.

"Non-Final Office Action", U.S. Appl. No. 12/163,801, (Apr. 22, 2010), 10 pages.

"Non-Final Office Action", U.S. Appl. No. 12/163,801, (Jul. 20, 2011), 11 pages.

"Non-Final Office Action", U.S. Appl. No. 12/434,000, (Nov. 10, 2010), 9 pages.

"Non-Final Office Action", U.S. Appl. No. 12/436,577, (Sep. 29, 2010), 6 pages.

"Non-Final Office Action", U.S. Appl. No. 12/494,076, (Dec. 22, 2010), 12 pages.

(56) References Cited

OTHER PUBLICATIONS

"Non-Final Office Action", U.S. Appl. No. 13/092,734, (Aug. 24, 2011), 15 pages.
"Notice of Allowance", U.S. Appl. No. 10/702,744, (Mar. 27, 2009), 7 pages.
"Notice of Allowance", U.S. Appl. No. 12/182,014, (Jan. 20, 2011), 6 pages.
"Notice of Allowance", U.S. Appl. No. 12/436,577, (Apr. 14, 2011), 4 pages.
"Partial European Search Report", *Application No. EP04006012; European Patent Office*, Munich, Germany, (Mar. 14, 2005), 2 pages.
"Restriction Requirement", U.S. Appl. No. 10/702,744, (Jun. 30, 2006), 5 pages.
Litaize, Daniel et al., "Serial Multi Port Memory Component Comprising RAM Memory Bank Assemblies for Use in Computer", Abstract of FR2779843; Publication No. FR2779843; esp@cenet database; http://v3.espace.com/textdoc?DB=EPODOC&IDX=FR2779843&F=0, (Dec. 12, 1999), 1 page.
Mori, Toshiki "Multiport Memory", English Abstract of Japanese Patent Publication No. JP5047174; esp@cenet database—Worldwide, (Feb. 26, 1993), 1 page.
Pallampati, Amarnath "iSCSI Performance Over RDMA-Enabled Network", *Thesis*, Department of Electrical and Computer Engineering, Graduate School of Wichita State University, (Jul. 2006), 58 pages.
Prince, Betty "High Performance Memories, New Architectures DRAMs and SRAMs—Evolution and Function", John Wiley & Sons, Ltd.; West Sussex, England, (1996), pp. 58-61.
"Final Office Action", U.S. Appl. No. 12/434,000, Sep. 4, 2012, 17 pages.
"Foreign Notice of Allowance", Japanese Application No. 2008-270813, Aug. 31, 2012, 7 pages.
"Notice of Allowance", U.S. Appl. No. 12/494,076, Aug. 2, 2012, 8 pages.
"Notice of Allowance", U.S. Appl. No. 13/716,481, Nov. 14, 2013, 13 pages.
"Corrected Notice of Allowance", U.S. Appl. No. 13/268,183, Nov. 19, 2013, 2 pages.
"Notice of Allowance", U.S. Appl. No. 13/177,965, Nov. 20, 2013, 5 pages.

* cited by examiner

| Ethernet Module | 130 |
|---|---|
| Subsystem Processor(s) | 202 |

| SRAM | 204 |
|---|---|
| Firmware | 206 |
| Memory Block(s) | 208 |
| Buffer(s) | 210 |

| LAN Interface | 212 |
|---|---|
| Transmit Block | 218 |
| Receive Block | 220 |
| List Element Table | 222 |

| USB Interface | 214 |
|---|---|
| Host Interface | 216 |

| Memory Block Manager | 224 |
|---|---|
| Lock/Counter List | 226 |
| Lock Bit | 228 |
| Buffer Counter | 230 |
| Identifier Bit(s) | 232 |
| Free Bit | 234 |
| Request Register | 236 |
| IRQ Generator | 238 |
| Transaction Register | 240 |
| Transaction Buffer | 242 |

Fig. 2

HARDWARE-SUPPORTED MEMORY MANAGEMENT

RELATED APPLICATIONS

This application claims priority to U.S. Provisional Patent Application Ser. No. 61/312,872 filed Mar. 11, 2010, the disclosure of which is incorporated by reference herein in its entirety.

BACKGROUND

The background description provided herein is for the purpose of generally presenting the context of the disclosure. Unless otherwise indicated herein, the approaches described in this section are not prior art to the claims in this application and are not admitted to be prior art by inclusion in this section.

Ethernet-enabled devices often include an embedded CPU subsystem for processing packets transmitted or received through an Ethernet interface. Transmit and receive paths of a conventional packet-processing subsystem typically have a simple architecture for communicating packets between an Ethernet interface and a host device. This simple architecture of the transmit and receive paths, however, cannot efficiently communicate management frames associated with system management applications, such as alert standard format (ASF) and desktop and mobile architecture for system hardware (DASH) applications. These packet-processing subsystems often copy these frames to an intermediate memory location before data of the frames is processed and forwarded to another interface of the device, such as a universal serial bus (USB), video, audio, and/or print interface. Copying packets to an intermediate memory location consumes valuable CPU cycles, memory, or time, which can increase communication latency and limit the rate at which the packet-processing subsystem can process packet data. A packet-processing subsystem that is unable to process and forward packet data at a sufficient rate may compromise the performance and usability of applications relying on the packet data.

SUMMARY

This summary is provided to introduce subject matter that is further described below in the Detailed Description and Drawings. Accordingly, this Summary should not be considered to describe essential features nor used to limit the scope of the claimed subject matter.

A method is described for receiving a memory block allocation request from a packet-based interface, allocating a memory block to the packet-based interface, the packet-based interface capable of cutting a memory buffer from the memory block, and preventing allocation of the memory block to another packet-based interface until the memory block is freed.

Another method is described for receiving a request from a first or a second packet-based interface to free a memory block that is allocated to the first packet-based interface and freeing the memory block effective to allow the memory block to be reallocated to the first, the second, or a third packet-based interface.

A System-on-Chip is described that is configured to receive a memory block allocation request from a first packet-based interface, allocate a memory block to the first packet-based interface effective to enable the first packet-based interface to cut a memory buffer from the memory block for packet data storage, and prevent the memory block from being allocated to a second packet-based interface until the memory block is freed.

BRIEF DESCRIPTION OF THE DRAWINGS

The details of one or more implementations are set forth in the accompanying figures and the detailed description below. In the figures, the left-most digit of a reference number identifies the figure in which the reference number first appears. The use of the same reference numbers in different instances in the description and the figures indicate like elements.

FIG. 2 illustrates a detailed aspect of an example network interface module shown in FIG. 1.

DETAILED DESCRIPTION

Conventional techniques for processing packet data (e.g., packet data associated with management frames and other non-standard packets) typically requires the packet data to be copied to an intermediate memory location prior to the packet data being forwarded to an appropriate interface. However, copying packet data to an intermediate memory location, such as a first-in-first-out (FIFO) buffer, generally consumes CPU cycles, memory, and/or time, which may compromise the performance of data interfaces and applications reliant on the processed packet data. This disclosure describes apparatuses and techniques for hardware-supported memory management that allows packet data associated with management frames and non-standard packets to be processed without having to copy the packet data to an intermediate memory location.

The following discussion describes an operating environment, techniques that may be employed in the operating environment, and a System-on-Chip (SoC) in which components of the operating environment can be embodied. In the discussion below, reference is made to the operating environment by way of example only.

Operating Environment

Figure 1:
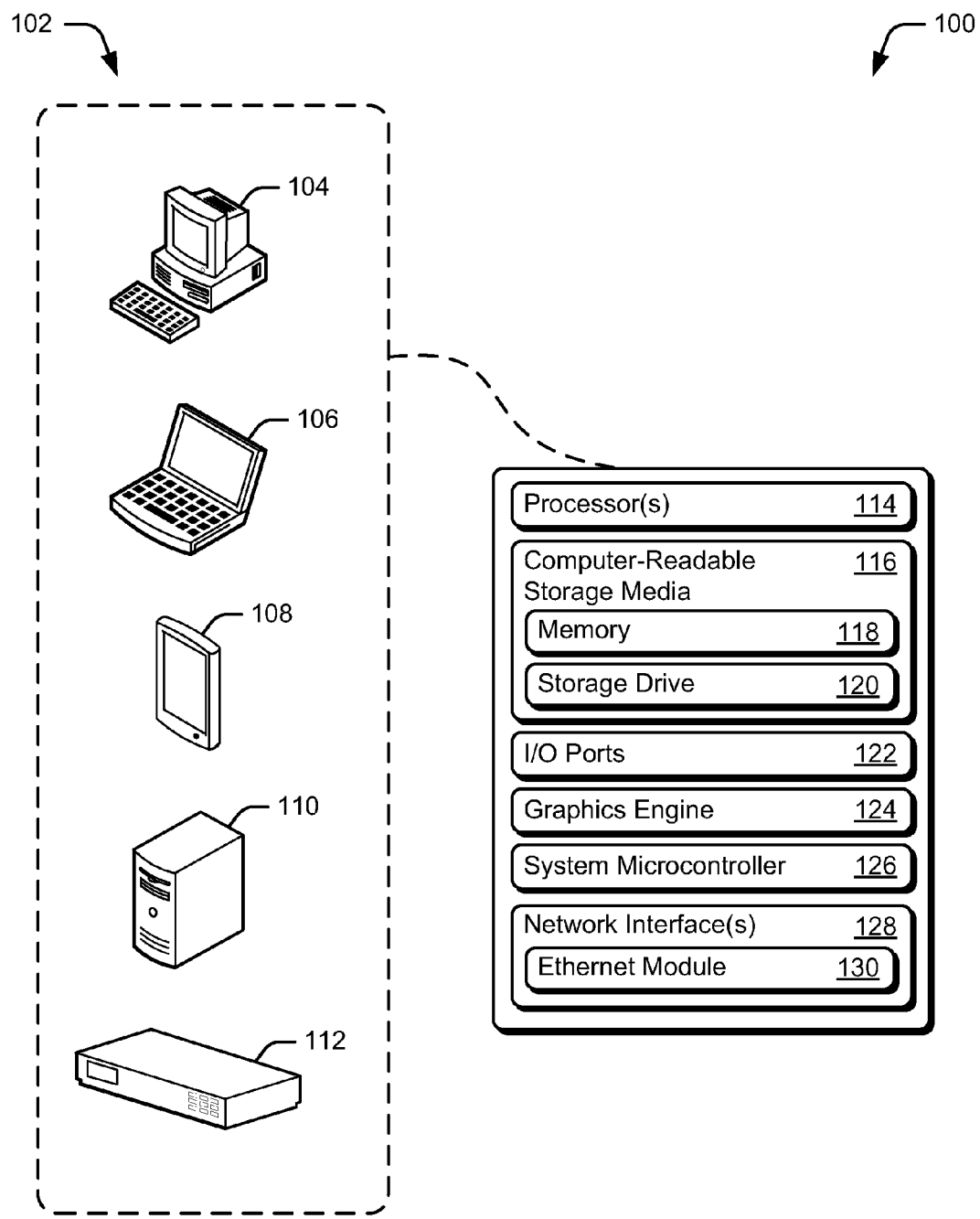
FIG. 1 illustrates an operating environment having Ethernet-enabled devices in accordance with one or more aspects.

FIG. 1 illustrates an example operating environment 100 having Ethernet-enabled devices 102, each of which are capable of communicating packets and/or frames in accordance with an Ethernet standard. Ethernet-enabled devices 102 include desktop computer 104, laptop computer 106, tablet computer 108, server 110, and set-top box 112. Ethernet-enabled devices 102 are capable of communicating in accordance with a variety of Ethernet standards, such as IEEE 802.3 through IEEE 802.3az. For instance, desktop computer 104 may communicate with server 110 over a 10 Gb/s Ethernet connection within a local-area-network (LAN) or wide-area-network (WAN) in accordance with IEEE 802.3ae.

Ethernet-enabled devices 102 are capable of transmitting and receiving data over an Ethernet connection. Data communicated over the Ethernet connection may be structured any suitable way, such as packetized data or frames comprising one or more data packets framed with additional header and/or tail information for a particular network layer. The frames and packets may also include management frames associated with management applications, such as ASF or DASH applications, or other non-Ethernet-standard frames and packets communicated with other packet-based interfaces of an Ethernet-enabled device 102. In some cases, packets and frames are communicated with other packet-based interfaces of a device for re-directing video and/or audio feeds, re-directing user input (remote or local), or providing offload support for print applications.

Each Ethernet-enabled device 102 includes processor(s) 114 and computer-readable storage media 116. Computer-readable storage media 116 may include any type and/or combination of suitable storage media, such as memory 118 and storage drive(s) 120. Memory 118 may include memory such as dynamic random-access memory (DRAM), read-only memory (ROM), or Flash memory (not shown) useful to store data of applications and/or an operating system of the Ethernet-enabled device 102. Storage drive(s) 120 may include hard disk drives and/or solid-state drives (not shown) useful to store code or instructions associated with an operating system and/or applications of Ethernet-enabled device 102. Processor(s) 114 can be any suitable type of processor, either single-core or multi-core, for executing instructions or commands of the operating system or applications stored on storage drive(s) 120.

Ethernet-enabled devices 102 also each include I/O ports 122, graphics engine 124, system microcontroller 126, and network interface(s) 128. I/O ports 122 allow an Ethernet-enabled device 102 to interact with other devices and/or users. I/O ports 122 may include any combination of internal or external ports, such as audio inputs and outputs, USB ports, Serial ATA (SATA) ports, PCI-express based ports or card-slots, and/or other legacy ports. I/O ports 122 may also include or be associated with a packet-based interface, such as a USB host controller, digital audio processor, or SATA host controller. Various peripherals may be operatively coupled with I/O ports 122, such as human-input devices (HIDs), external computer-readable storage media, or other peripherals.

Graphics engine 124 processes and renders graphics for Ethernet-enabled device 102, including user interface elements of an operating system, applications, command interface, or system administration interface. System microcontroller 126 manages low-level system functions of Ethernet-enabled device 102. Low-level system functions may include power status and control, system clocking, basic input/output system (BIOS) functions, switch input (e.g. keyboard and button), sensor input, system status/health, and other various system "housekeeping" functions.

Network interface(s) 122 provides connectivity to one or more networks and includes Ethernet module 124, which allows the device to communicate via an Ethernet connection. Generally, Ethernet module 124 communicates packets over a LAN with other Ethernet clients, such as a server or internet gateway. Components of Ethernet module 124 and how they are implemented and used varies and are described below. Network interface(s) may also include other various communication modules that allow a device to communicate over other types of networks, such as wireless LANs, cellular networks, and/or wireless personal-area-networks (WPANs).

FIG. 2 illustrates a detailed example of an Ethernet module 130 capable of communicating data over a network with other devices in accordance with one or more Ethernet standards. Ethernet module 130 includes subsystem processor(s) 202 and static random-access memory (SRAM) 204, which contains firmware 206 that is executable to, among other things, manage packet processing as packets are received and transmitted by Ethernet module 130. Information useful for managing packet processing, such as packet characteristics relating to length, type, and data offset, are contained in various fields of the packet as defined by one or more packet descriptors.

Although shown as SRAM, SRAM 204 may represent any suitable type of memory such as non-volatile ROM (NVRAM) or Flash memory. SRAM 204 also contains memory block(s) 208 that are useful for packet data of packets that are received and transmitted by Ethernet module 130. SRAM 204 may be configured such that memory space not occupied by firmware 206 is configured as memory block(s) 208 from which buffer(s) 210 are cut from for storing packet data. In other instances, firmware 206 and memory block(s) 208 may reside in separate SRAMs or memory devices.

SRAM 204 may contain any suitable number of memory blocks 208. Memory blocks 208 may each be configured to contain a similar amount of SRAM or may be configured independently based on the size of packets or frames processed within Ethernet module 130. For example, 384 kilo-Bytes (kB) of SRAM 204 can be partitioned into 96 memory blocks 208 having a size of 4 kB and byte-aligned at 4 kB address increments. Buffers 210 are cut from a memory block 208 for storing packet data including whole packets, packet fragments, offsets, and/or header information.

Generally, buffers 210 are cut to varying sizes based on an amount of data to be stored in the buffer. For example, buffers 210 for storing Ethernet data are typically cut to about the size of an Ethernet packet (e.g. 60 to 1514 bytes). A size of a buffer 210 may also be increased in order to include offsets and/or additional header information. Cutting buffers 210 of varying size and/or including offsets allows data within the buffer 210 to be compatible with multiple packet interfaces implementing one or more packet descriptors.

Ethernet module 130 also includes packet-based interfaces: LAN interface 212, USB interface 214, and host interface 216. LAN interface 212 contains transmit block 218, receive block 220, and list element table 222 for communicating packets into and out of Ethernet-enabled device 102 over the wire. Transmit block 218 transmits packets queued for transmission from buffers 210 out of the device and over the wire. Receive block 220 receives packets over the wire and places references to the packets into list element table 222 for processing. In some cases, list element table 222 contains list elements or buffer descriptors (e.g. memory address, length, offset, or status) associated with packet data processed by executing firmware 206, which moves the packets of LAN interface 212 into buffers 210 for manipulation and/or distribution to other packet-based interfaces.

USB interface 214 allows packets to be communicated between Ethernet module 130 and a USB host controller, such as an enhanced host controller interface (EHCI) or an extensible host controller interface (xHCI). Generally, packets in buffers 210 are forwarded to USB interface 214 and received into buffers 210 from USB interface 214. Although a packet descriptor implemented by USB interface 214 may differ from a packet descriptor used by LAN interface 212 or other packet-based interfaces of Ethernet module 130, packet data of buffers 210 can be organized such that the packet data, including packet data stored across memory block boundaries, can be forwarded to USB interface 214 without intermediate copying.

Host interface 216 communicates packet data with higher-level components of an Ethernet-enabled device 102, such as applications, programs, an operating system, or other network related components. In some cases, host interface 216 is embodied as host-filtering functionality in hardware of LAN interface 212. Generally, packet data associated with host interface 216 is communicated via memory blocks 208 with LAN interface 212. While stored in memory blocks 208, this data can be processed by executing firmware 206 or by the hardware-implemented host-filtering functionality as described above.

Memory block manager (manager) 224 provides an interface for firmware 206 and packet-based interfaces of Ethernet module 130 to access memory blocks 208. Generally, manager 224 allocates a memory block 208 to a requestor, such as firmware 206 or host interface 216, allowing the requestor to cut a memory buffer 210 from the memory block 208. Conversely, manager 224 also frees a memory block 208 from an allocator (e.g. a requestor to which a memory block 208 has been allocated), allowing another packet-based interface or process to access the memory block 208.

Manager 224 includes lock/counter list 226 to maintain a status of memory blocks 208, such as, in the context of the above example, the 96 4 kB memory blocks 208 byte-aligned at 4 kB address increments. Lock/counter list 226 contains an entry for each memory block 208 of SRAM 204. Each entry of lock/counter list 226 includes one or more bits indicating a status of a memory block including lock bit 228, bits for a buffer counter 230, and identifier (ID) bit(s) 232, which store an identity of an allocator. Lock bit 228 indicates whether a memory block 208 is locked and unavailable or unlocked and may be available if and/or when the buffer counter associated with the memory block equals zero.

Buffer counter 230 indicates a number of buffers 210 that have been cut from a memory block 208. Typically, buffer counter 230 is incremented or decremented as buffers 210 are cut or freed from memory blocks 208. The number of buffers 210 cut from a memory block 208 may be limited by the number of bits used to implement buffer counter 230 (e.g. a 255 buffer counter limit for 8 counter bits). In some cases, manager 224 includes free bit 234 indicating that a memory block 208 is free (i.e. unlocked and buffer counter 230 equal to zero) for reallocation.

Manager 224 also includes request register 236, which accepts request codes from allocation requestors of memory blocks 208, such as firmware 206 or packet-based interfaces of Ethernet module 130. The request codes may include block-related or buffer-related requests such as 'get block', 'unlock block', 'increment buffer counter', 'decrement buffer counter', and the like. The request codes may be any suitable size and implement any suitable structure for operand and/or data fields.

By way of example, consider the above mentioned request codes having a length of 32 bits and respective data fields containing appropriate information allowing manager 224 to manage memory blocks 208. In the context of the present example, some bit fields are common to all request codes, such as bit 0, which indicates a pending command as '1' or a complete command as '0'. Additionally, the four request codes are indicated by bits 2:1, with each bit combination representing a request code. The remaining bits of the request codes are specific for each request code.

In this example a 'get block' (request code 0x01) request includes a requestor ID in bits 7:4 and an 'unlock block' (request code 0x00) request includes an address of a memory block 208 in bits 31:3. A response to a 'get block' request includes an address of memory block 208, if available, in bits 31:4, while a response to an 'unlock block' request uses bit 0 to indicate the unlock request is complete. Request codes 'increment buffer counter' (request code 0x10) and 'decrement buffer counter' (request code 0x11) include a buffer address to increment or decrement using bits 31:3, while the response to the buffer requests uses bit 0 to indicate that the request is complete. Concluding the present example, unless reserved for another purpose, manager 224 sets bit 3 when a request cannot be completed, alerting a requestor of an exception.

For error-handling and debugging purposes, manager 224 also includes IRQ generator 238, exception register 240, and transaction buffer 242. IRQ generator 238 indicates an operational exception when request codes cannot be completed or when parameters of manager 224 violate programmable thresholds, such as a number of available free memory block 208, memory leaks, or overflows of buffer counter 230. Exception register 240 contains a transaction of an operation(s) associated with the IRQ-generating request code. The transaction of the operation(s) may include other information useful for debugging, such as a type of the operation, an address of the operation, and a requestor ID. Additionally, transaction buffer 242 stores past transactions of operations associated with request codes for debugging and may be structured as a ring buffer for continuity.

Techniques of Hardware-Supported Memory Management

The following discussion describes techniques of hardware-supported memory management. These techniques can be implemented using the previously described environment, such as memory block manager 224 of FIG. 2 embodied on an Ethernet-enabled device 102. These techniques include methods illustrated in FIGS. 3 and 5, each of which is shown as a set of operations performed by one or more entities. These methods are not necessarily limited to the orders shown for performing the operations. Further, these methods may be used in conjunction with one another, whether performed by the same entity, separate entities, or any combination thereof. In portions of the following discussion, reference will be made to operating environment 100 of FIG. 1 and entities of FIG. 2 by way of example. Such reference is not to be taken as limited to operating environment 100 but rather as illustrative of one of a variety of examples.

Figure 3:
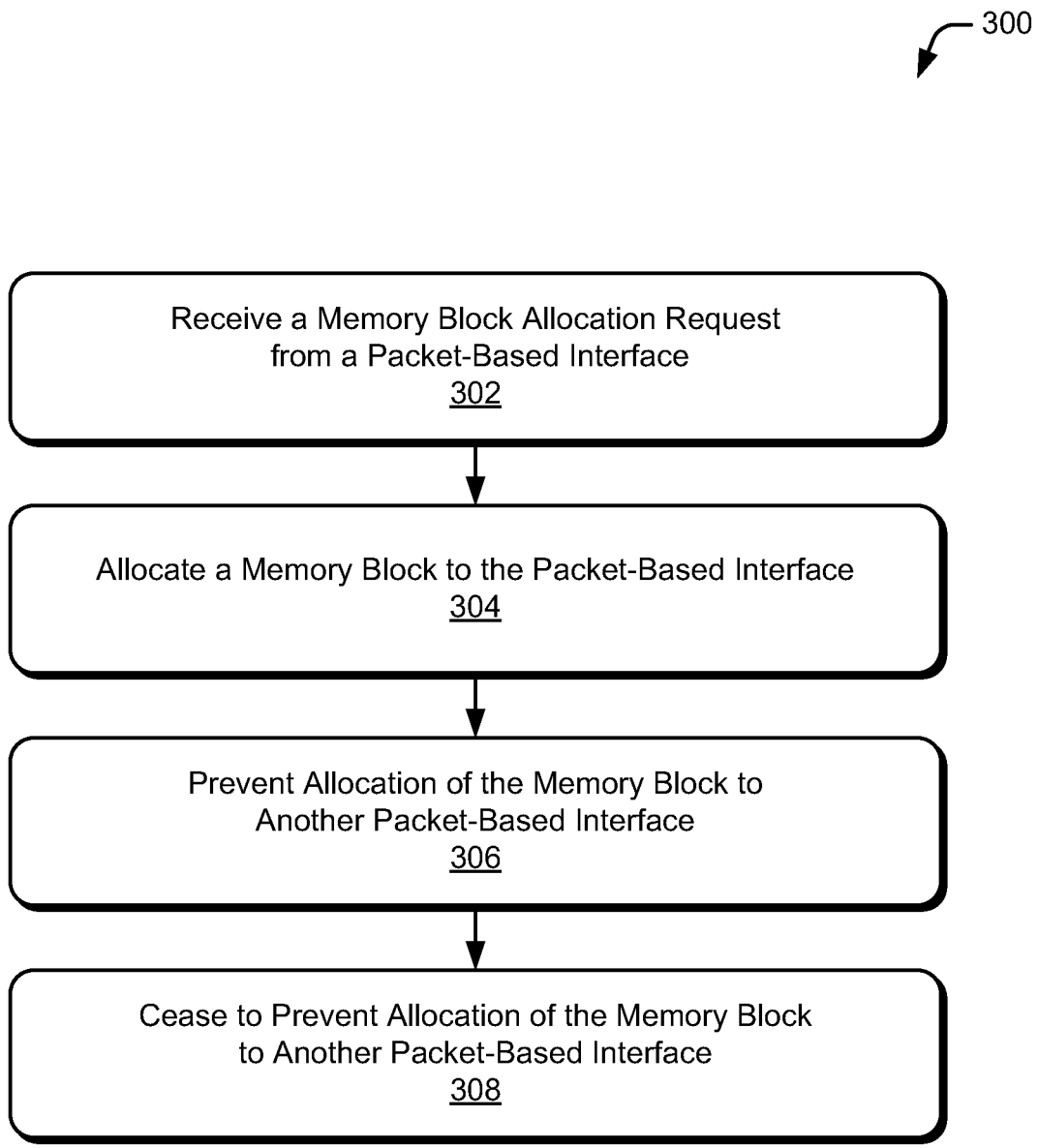
FIG. 3 illustrates a method of allocating a memory block to a packet-based interface.

FIG. 3 depicts a method 300 for allocating a memory block to a packet-based interface. Generally, method 300 allows for processing of management frames and non-standard Ethernet packets without copying packet data to an intermediate location.

At 302, a memory block allocation request is received from a packet-based interface. In some cases, the block allocation request may be a 'get block' request code received from firmware executed by a packet processing sub-system or a packet-based interface. The packet-based interface may be any suitable packet-based interface, such as, a USB interface, a LAN interface, or a host interface. The packet-based interface may be requesting memory block allocation in order to cut buffers from the memory block.

Figure 4:
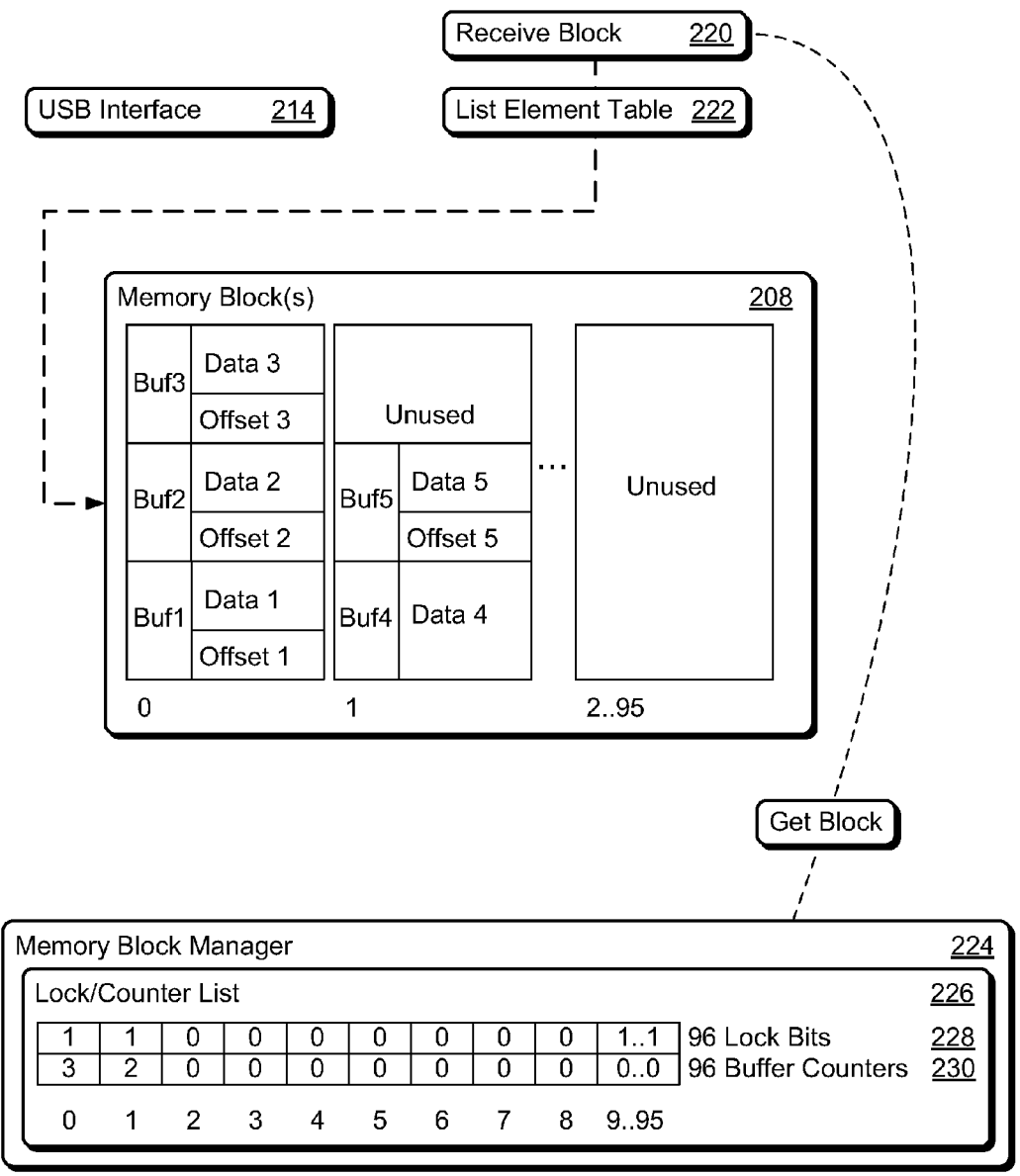
FIG. 4 illustrates an example of a memory block manager allocating a memory block.

This is illustrated in FIG. 4, which shows manager 224 receiving a 'get block' request from receive block 220 of LAN interface 212 (not shown). In this example, receive block 220 requests allocation of memory blocks 208 in order to store received packet data. Assume here that receive block 220 has received a USB-based management frame and an Ethernet packet.

At 304, a memory block is allocated to the packet-based interface to enable packet-based interface to cut a memory buffer from the memory block. A response may be sent to the packet-based interface acknowledging the allocation of the memory block. In some cases, a bit associated with the memory block is set to indicate the status of the allocated memory block. Additionally, a buffer counter is maintained to track a number of buffers cut from a particular memory block.

Once the memory block is allocated to the packet-based interface (now referred to as an allocator), the allocator may cut memory buffers from the memory block. As the memory buffers are cut, the buffer counter associated with the memory block is updated. In some cases, an 'increment buffer counter' request code is received indicating a buffer has been cut from the memory block. The buffer counter is incremented accordingly as the packet-based interface cuts memory buffers from the memory block.

The memory buffers may be cut to any suitable size and may include offsets useful for appending header or framing information to packet data. In instances where the allocator is implementing a packet descriptor different from another packet-based interface, the memory buffers may be configured such that the data stored in the memory buffer is compatible with the different packet descriptors. In instances where packet data is broken across memory blocks, an offset is omitted to preserve compatibility with other packet descriptors.

In the context of the present example illustrated by FIG. 4, manager 224 allocates memory block 208 (0) to receive block 220, replies to receive block 220 with an address for block 208 (0), and sets a corresponding lock bit 228 of lock/counter list 226 to '1' indicating memory block 208 (0) is allocated. Assume here that receive block 220 cuts three buffers from memory block 208 (0) and moves data packets 1-3 of the USB-based management frame from receive block 220 to the cut memory buffers buf1-buf3.

As memory buffers buf1-buf3 are cut, manager 224 updates lock/counter list 226 to '3' reflecting the number of buffers cut from memory block 208 (0). Also assume here that the USB-based management frame is larger than memory block 208 (0) and receive block 220 requests allocation of another memory block to store the rest of the packet data associated with the USB-based management frame. Manager 224 allocates memory block 208 (1) to receive block 220, sets the appropriate lock bit, and updates the appropriate buffer counter as described above. Although shown as consecutive memory block allocation in this particular example, any available memory block may be allocated to a requesting entity.

In the context of the present example, receive block 220 moves the remaining data (data 4) of the USB-based management frame to memory buffer buf4 and packet data of the Ethernet packet to memory buffer buf5 as data 5. Omitting an offset in memory buffer buf4 allows packet data of buf3 and buf4 (data 3 and data 4) to be forwarded directly to USB interface 214. Keeping data contiguous across memory block boundaries allows a descriptor having a length and a single offset to describe the packet data.

At 306, allocation of the memory block to another packet-based interface (e.g. the allocator) is prevented. The other packet-based interfaces may include a USB interface, a LAN interface, or a host interface. In some cases, the memory block is prevented from being allocated to the other packet-based interface until the memory block is freed. Preventing the allocated memory block from being re-allocated prevents a concurrent access to a single memory location by the other packet-interfaces and may include setting a block lock-bit associated with the allocated memory block.

Concluding the present example illustrated by FIG. 4, lock bits 228 associated with memory block 208 (0) and 208 (1) are set. Manager 224 will then allocate memory blocks other than memory blocks 208 (0) and (1) to subsequent requestors.

In case there are no available memory blocks, manager 224 replies to a memory block allocation request with a response indicating such.

Optionally at 308, preventing allocation of the memory block to another packet-based interface ceases. In some cases, this is in response to receiving an indication of a buffer counter decrement or an unlock block request. This indication may be an update to a 'free bit' associated with the memory block. Ceasing to prevent allocation of the memory block to the other packet-based interfaces may include clearing a memory block lock bit, decrementing a counter buffer, and/or setting a free bit associated with the memory block.

Operations of blocks 302, 304, 306 and 308 may be repeated in order to process additional packet data of management frames or non-standard Ethernet packets without copying the packet data to an intermediate memory location. Processing frames and packets without copying the packet data to an intermediate memory location conserves CPU cycles, memory space, and/or time thereby improving packet processing throughput and efficiency.

Figure 5:
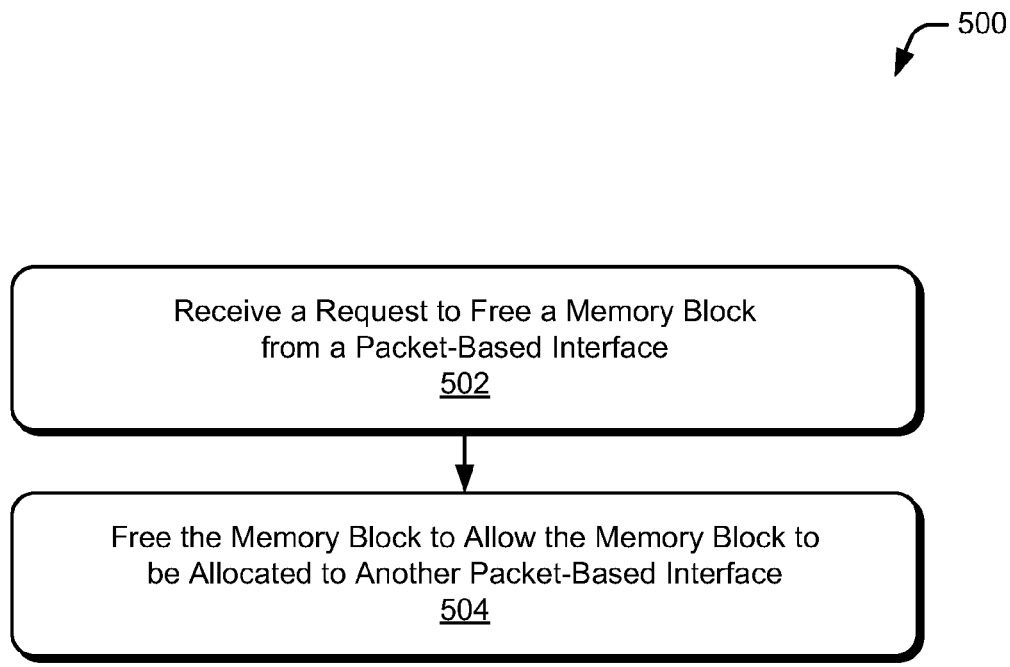
FIG. 5 illustrates a method of freeing a memory block allocated to a packet-based interface.

FIG. 5 depicts a method 500 for freeing a memory block allocated to a packet-based interface.

At 502, a request to free an allocated memory block is received from a packet-based interface. The packet-based interface may be any suitable packet-based interface, such as a USB interface, a LAN interface, or a host interface. The request to free the allocated memory block may include a 'decrement buffer counter' request code or an 'unlock block' request code. The 'unlock block' request code may be received from a packet-based interface to which the memory block is allocated.

The 'decrement buffer counter' request code may be received from a packet-based interface consuming data of a memory buffer within the allocated memory block. When a 'decrement buffer counter' request code is received a buffer counter associated with the memory block may be decremented and updated as buffers within the memory block are accessed and/or cleared by a packet-based interface. Once a buffer counter of a memory block is decremented to zero and the memory block is unlocked, the memory block is free and/or available for re-allocation to a packet-based interface.

Figure 6:
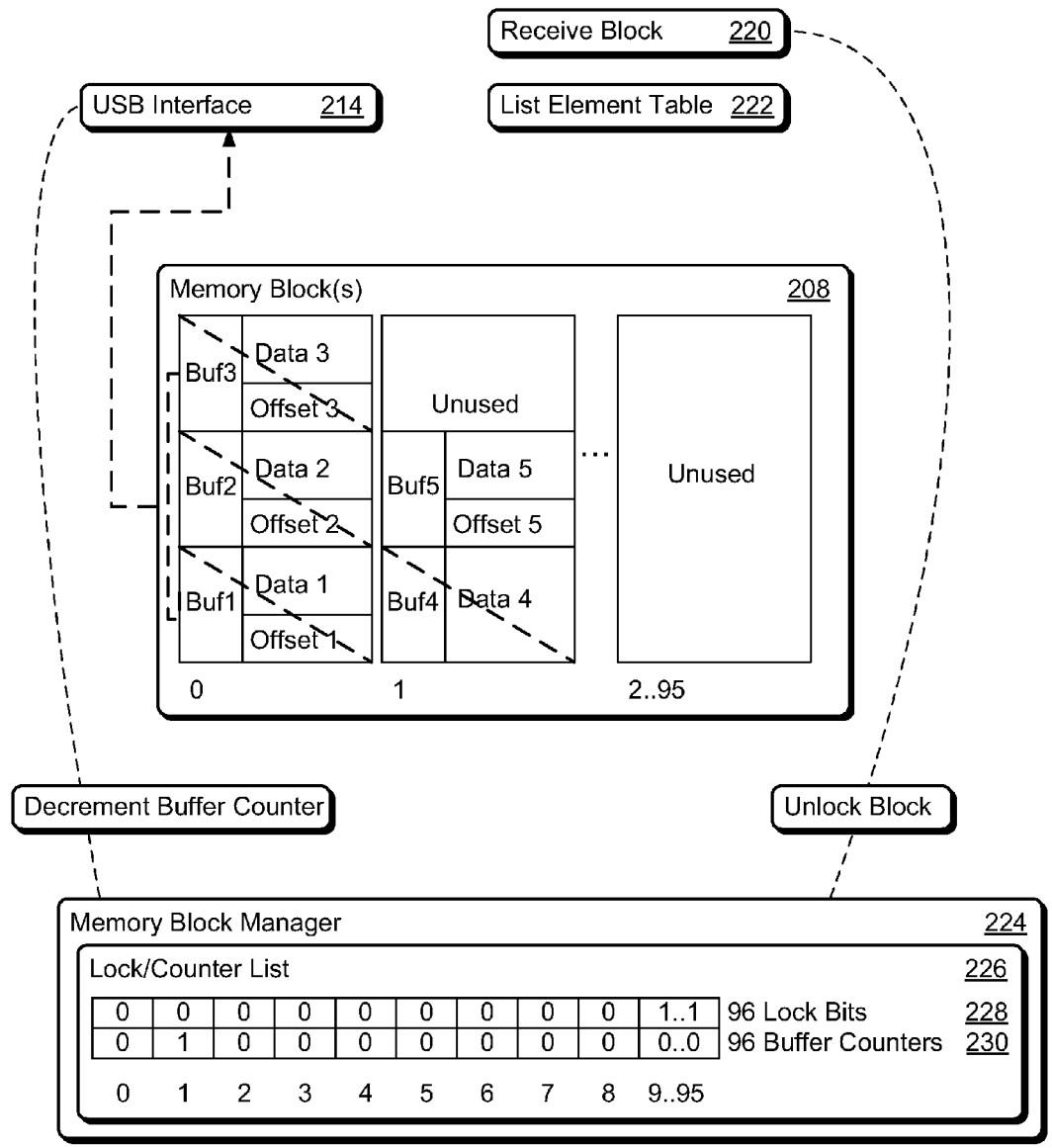
FIG. 6 illustrates an example of a memory block manager freeing a memory block.

FIG. 6 illustrates manager 224 receiving an 'unlock block' request code from receive block 220 of LAN interface 212 (not shown). In this example, receive block 220 sends the 'unlock block' request code including addresses of memory blocks 208 (0) and (1). Manager 224 also receives a 'decrement buffer counter' request code from USB interface 214 as data from each respective memory buffer buf1-buf4 is consumed by USB interface 214. In the context of the present example, assume that device transfer descriptors (DTDs) 1-3 have been created by firmware 206 and forwarded to USB interface 214 for data 1-4. Assume here that DTD1 is associated with data 1, DTD2 is associated with data 2, and DTD 3 is associated with data 3-4.

Although packet data of the USB-based management frame is stored in memory buffers spanning different memory blocks, DTD3 provided to USB interface 214 is useful to forward data 3-4 out of memory blocks 208 (0) and 208 (1) as USB data packets. Data 3 and 4 are forwarded as a single USB data packet compliant with the descriptor implemented by USB interface 214. As described above, omitting an offset as packet data crosses over one or more non-contiguous memory blocks allows a descriptor to be used that contains a packet length and a single offset (e.g., a USB compatible DTD). As the data is forwarded from the buffers buf1-buf4, USB interface 214 issues 'decrement buffer counter' request codes for each memory buffer.

At 504, the memory block is freed to allow the memory block to be reallocated to a packet-based interface. The packet-based interface that the memory block is reallocated to may be the same packet-based interface or another packet-based interface. The memory block may be freed when an 'unlock block' request code is received and/or when a 'decrement buffer counter' request code is received. In some cases, the memory block is freed after, or independent of, the requests indicating that the memory block is to be unlocked and/or the determination that the memory block contains no buffers.

Allowing the memory block to be allocated to the packet-based interface enables the packet-based interface to cut a memory buffer from the memory block once allocated. In some cases, the memory buffer is configured such that the packet data can be accessed by multiple packet-based interfaces implementing different packet descriptors without intermediate copying of the data.

An address of the freed memory block may be stored as an available memory block or as a first available memory block. The address of the first available memory block can be checked, and updated appropriately, each time a memory block is freed from an allocator. Alternately or additionally, a free-memory block counter can be maintained to track a number of memory blocks available for allocation. The free-memory block counter is incremented when a memory block is freed or decremented when a memory block is allocated.

Concluding the present example, manager 224 clears lock bits 228 associated with memory block 208 (0) and 208 (1) in response to receiving the 'unlock block' request codes from receive block 220. Manager 224 also decrements buffer counters 230 associated with memory blocks 208 (0) and 208 (1) based on the 'decrement counter buffer' request codes received from USB interface 214. Memory block 208 (0) is then freed by manager 224 after determining that the buffer counter 230 associated with unlocked memory block 208 (0) is equal to zero. Once freed, memory block 208 (0) can be reallocated to a packet-based interface.

System-on-Chip

Figure 7:
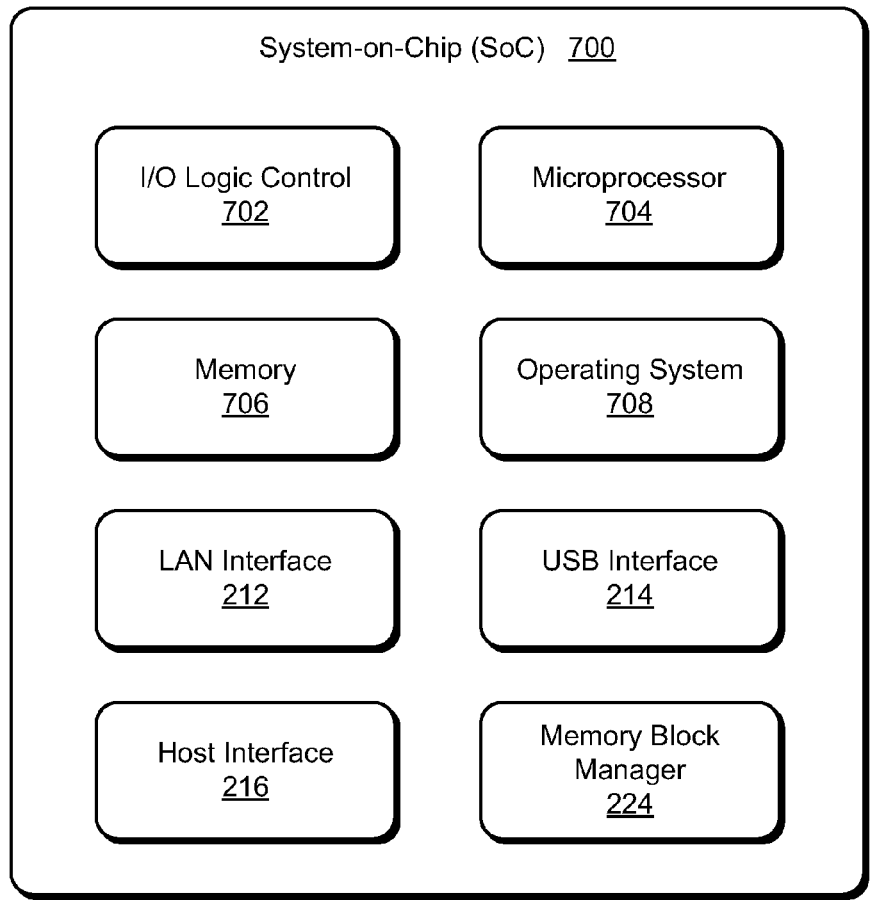
FIG. 7 illustrates a System-on-Chip (SoC) environment for implementing aspects of the techniques described herein.

FIG. 7 illustrates a System-on-Chip (SoC) 700, which can implement various embodiments described above. A SoC can be implemented in any suitable Ethernet-enabled device, such as a video game console, IP enabled television, desktop computer, laptop computer, tablet computer, server, network-enabled printer, set-top box, and/or any other type of device that may implement Ethernet connective technology.

SoC 700 can be integrated with electronic circuitry, a microprocessor, memory, input-output (I/O) logic control, communication interfaces and components, other hardware, firmware, and/or software needed to provide communicate coupling for a device, such as any of the above-listed devices. SoC 700 can also include an integrated data bus (not shown) that couples the various components of the SoC for data communication between the components. A wireless communication device that includes SoC 700 can also be implemented with many combinations of differing components. In some cases, these differing components may be configured to implement concepts described herein over a wireless connection or interface.

In this example, SoC 700 includes various components such as an input-output (I/O) logic control 702 (e.g., to include electronic circuitry) and a microprocessor 704 (e.g., any of a microcontroller or digital signal processor). SoC 700 also includes a memory 706, which can be any type of RAM, low-latency nonvolatile memory (e.g., flash memory), ROM, and/or other suitable electronic data storage. SoC 700 can also include various firmware and/or software, such as an operating system 708, which can be computer-executable instructions maintained by memory 706 and executed by microprocessor 704. SoC 700 can also include other various communication interfaces and components, communication components, other hardware, firmware, and/or software.

SoC 700 includes memory block manager 224 and packet-based interfaces LAN interface 212, USB interface 214, and host interface 216 (embodied as disparate or combined components as noted above). Examples of these various components, functions, and/or entities, and their corresponding functionality, are described with reference to the respective components of the environment 100 shown in FIG. 1 and FIG. 2.

Manager 224 in SoC 700, either independently or in combination with other entities, can be implemented as computer-executable instructions maintained by memory 706 and executed by microprocessor 704 to implement various embodiments and/or features described herein. Manager 224 may also be provided integral with other entities of the SoC, such as integrated with one or both of I/O logic controller 702 or any packet-based interface within SoC 700. Alternatively or additionally, manager 224 and the other components can be implemented as hardware, firmware, fixed logic circuitry, or any combination thereof that is implemented in connection with the I/O logic control 702 and/or other signal processing and control circuits of SoC 700.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method comprising:
   receiving a memory block allocation request from a packet-based interface;
   allocating a memory block to the packet-based interface in response to the memory block allocation request, the packet-based interface capable of cutting a memory buffer from the memory block, the memory buffer configured such that data stored in the memory buffer by the packet-based interface is accessible by another packet-based interface without intermediate copying, the packet-based interface and the other packet-based interface using different packet descriptors; and
   preventing allocation of the memory block to the other packet-based interface until the memory block is freed.

2. The method of claim 1, further comprising:
   maintaining a buffer counter; and
   incrementing the buffer counter in response to receiving an indication that the packet-based interface has cut a memory buffer from the memory block.

3. The method of claim 2, further comprising ceasing to prevent the memory block from being allocated to the other packet-based interface in response to receiving an unlock request from the packet-based interface or a decrement buffer counter request.

4. The method of claim 1, wherein the packet-based interface or the other packet-based interface includes: a USB interface, a LAN interface, or a host interface.

5. The method of claim 1, wherein:
   the data stored in the memory buffer by the packet-based interface is a data packet or a fragment of a data packet; and
   the memory buffer includes an offset for appending header or framing information to the data packet or the fragment of the data packet.

6. The method of claim 1, further comprising notifying, prior to the packet-based interface cutting a memory buffer from the memory block, the packet-based interface that the memory block has been allocated to the packet-based interface.

7. The method of claim 1, wherein preventing the memory block from being allocated to the other packet-based interface includes setting a memory block lock-bit associated with the memory block.

8. The method of claim 1, wherein the memory block allocation request includes a requestor identifier that identities the packet-based interface.

9. A system-on-chip comprising:
a first communication module having a first packet-based interface;
a second communication module having a second packet-based interface, wherein the first packet-based interface of the first communication module is communicatively coupled to the second packet-based interface of the second communication module, the first packet-based interface and the second packet-based interface using different packet descriptors;
a memory including memory blocks configurable to store packet data associated with the first packet-based interface and the second packet-based interface; and
a memory block manager configured to:
receive a memory block allocation request from the first packet-based interface, the first packet-based interface capable of cutting a memory buffer from the memory block to store packet data;
in response to the memory block allocation request, allocate a memory block to the first packet-based interface effective to enable the first packet-based interface to cut a memory buffer from the memory block for packet data storage, the memory buffer configured such that the packet data stored in the memory buffer by the first packet-based interface is accessible by the second packet-based interface without intermediate copying; and
prevent the memory block from being allocated to the second packet-based interface until the memory block is freed.

10. The system-on-chip of claim 9, wherein the first packet-based interface or the second packet-based interface includes: a USB interface, a LAN interface, or a host interface.

11. The system-on-chip of claim 9, wherein the memory buffer cut from the memory block includes an offset for appending header or framing information to the packet data.

12. The system-on-chip of claim 9, wherein the memory block manager is further configured to:
maintain a buffer counter associated with the memory block; and
increment the memory buffer counter in response to receiving an indication that the first packet-based interface has cut the memory buffer from the memory block.

13. The system-on-chip of claim 9, wherein the memory block manager is further configured to prevent the memory block from being allocated to the second packet-based interface by setting a memory block lock-bit associated with the memory block.

14. The system-on-chip of claim 9, wherein the memory block allocation request includes a requestor identifier that identities the first packet-based interface.

15. One or more non-transitory computer-readable storage devices comprising processor-executable instructions that, responsive to execution by a processor, implement a memory block manager to:
receive a memory block allocation request from a packet-based interface;
allocate a memory block to the packet-based interface in response to the memory block allocation request, the packet-based interface capable of cutting a memory buffer from the memory block, the memory buffer configured such that data stored in the memory buffer by the packet-based interface is accessible by another packet-based interface without intermediate copying, the packet-based interface and the other packet-based interface using different packet descriptors; and
prevent allocation of the memory block to the other packet-based interface until the memory block is freed.

16. The non-transitory computer-readable storage devices of claim 15, wherein the memory block manager is further implemented to:
maintain a buffer counter; and
increment the buffer counter in response to receiving an indication that the packet-based interface has cut a memory buffer from the memory block.

17. The non-transitory computer-readable storage devices of claim 15, wherein the memory block manager is further implemented to cease to prevent the memory block from being allocated to the other packet-based interface in response to receiving an unlock request from the packet-based interface or a decrement buffer counter request.

18. The non-transitory computer-readable storage devices of claim 15, wherein the packet-based interface or the other packet-based interface includes: a USB interface, a LAN interface, or a host interface.

19. The non-transitory computer-readable storage devices of claim 15, wherein:
the data stored in the memory buffer by the packet-based interface is a data packet or a fragment of a data packet; and
the memory buffer includes an offset for appending header or framing information to the data packet or the fragment of the data packet.

20. The non-transitory computer-readable storage devices of claim 15, wherein the memory block allocation request includes a requestor identifier that identities the packet-based interface.

* * * * *